(12) United States Patent
Haag et al.

(10) Patent No.: US 12,472,537 B1
(45) Date of Patent: Nov. 18, 2025

(54) HYDROCARBON GAS EMISSIONS CONTROL DEVICE FOR PIPELINE PIGGING OPERATIONS

(71) Applicant: The Williams Companies, Inc., Tulsa, OK (US)

(72) Inventors: Douglas Haag, Washington, PA (US); Dustin Arthurs, Washington, PA (US); Jamie Schrack, Moundsville, WV (US)

(73) Assignee: The Williams Companies, Inc., Tulsa, OK (US)

( * ) Notice: Subject to any disclaimer, the term of this patent is extended or adjusted under 35 U.S.C. 154(b) by 568 days.

(21) Appl. No.: 17/985,703

(22) Filed: Nov. 11, 2022

Related U.S. Application Data

(60) Provisional application No. 63/278,206, filed on Nov. 11, 2021.

(51) Int. Cl.
*B01D 53/86* (2006.01)
*B08B 9/055* (2006.01)
*B08B 15/00* (2006.01)

(52) U.S. Cl.
CPC .......... *B08B 9/0551* (2013.01); *B01D 53/864* (2013.01); *B08B 15/00* (2013.01)

(58) Field of Classification Search
CPC ...... B08B 9/0551; B08B 15/00; B01D 53/864
See application file for complete search history.

(56) References Cited

U.S. PATENT DOCUMENTS

| | | | |
|---|---|---|---|
| 7,749,308 B2 | 7/2010 | McCully | |
| 7,815,744 B2 | 10/2010 | Abney et al. | |
| 8,992,838 B1 | 3/2015 | Mueller | |
| 9,353,315 B2 | 5/2016 | Heath et al. | |
| 9,422,177 B2 | 8/2016 | Story et al. | |
| 9,764,255 B1 | 9/2017 | Mueller | |
| 9,776,155 B1 | 10/2017 | Mueller et al. | |
| 9,868,086 B2 | 1/2018 | Kuku et al. | |
| 9,919,240 B2 | 3/2018 | Shaw | |
| 9,982,516 B2 | 5/2018 | Ricotta | |
| 10,001,240 B1 | 6/2018 | Dray et al. | |
| 10,012,340 B1 | 7/2018 | Dray et al. | |
| 10,094,508 B1 | 10/2018 | Dray et al. | |

(Continued)

FOREIGN PATENT DOCUMENTS

| | | | | |
|---|---|---|---|---|
| WO | 2020144409 A3 | 9/2020 | | |
| WO | WO-2024145230 A1 | * 7/2024 | ......... | F16K 37/0091 |

*Primary Examiner* — Sharidan Carrillo
(74) *Attorney, Agent, or Firm* — Crowe & Dunlevy, P.C.

(57) ABSTRACT

Systems and methods for reducing hydrocarbon gas emissions include the use of an emissions control system connected to a transfer station on a gas pipeline. The transfer station can be a pig launcher or a pig receiver. The emissions control system includes a transfer tank connected to the transfer station through a transfer line and a catalytic heater connected to the transfer tank through a catalytic feed line. The methods call for transferring pressurized hydrocarbon gases from the transfer station to the transfer tank, which is sized to accept a rapid transfer of a large volume of hydrocarbon gases from the transfer station. Once the gas transfer operation has taken place, the hydrocarbon gases can be more slowly processed through the catalytic heater from the transfer tank. The process can be repeated until a sufficient volume of hydrocarbon gases have been removed from the transfer station.

16 Claims, 4 Drawing Sheets

(56) References Cited

U.S. PATENT DOCUMENTS

Figure 1:
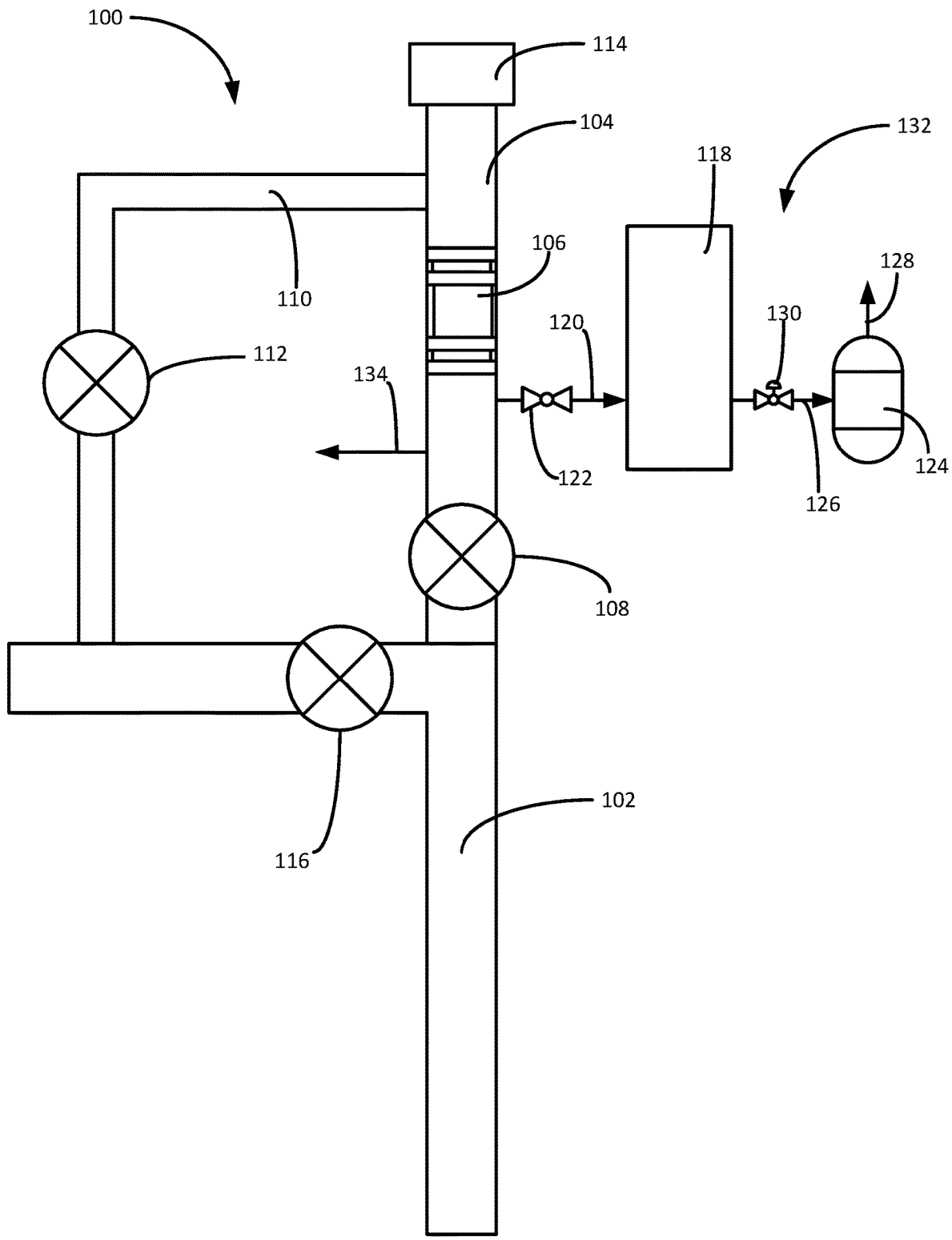

| | | |
|---|---|---|
| 10,315,160 B2 | 6/2019 | Chen et al. |
| 11,067,335 B1 | 7/2021 | Van Der Walt et al. |
| 11,112,174 B1 | 9/2021 | Van Der Walt et al. |
| 11,161,076 B1 | 11/2021 | Van Der Walt et al. |
| 2007/0151292 A1 | 7/2007 | Heath et al. |
| 2007/0151603 A1* | 7/2007 | McCully ................ B08B 9/055 166/267 |
| 2007/0186770 A1 | 8/2007 | Heath et al. |
| 2018/0169718 A1* | 6/2018 | Aslam ................... B08B 7/0021 |
| 2020/0306690 A1 | 10/2020 | Smith |
| 2022/0307655 A1* | 9/2022 | Van Der Walt ....... B08B 15/002 |

* cited by examiner

HYDROCARBON GAS EMISSIONS CONTROL DEVICE FOR PIPELINE PIGGING OPERATIONS

RELATED APPLICATIONS

The present application claims the benefit of U.S. Provisional Patent Application Ser. No. 63/278,206 filed Nov. 11, 2021 and entitled, "Hydrocarbon Gas Emissions Control Device for Pipeline Pigging Operation," the disclosure of which is herein incorporated by reference thereto.

FIELD OF THE INVENTION

The subject matter disclosed herein relates to greenhouse gas emissions control devices, and more particularly to systems and methods designed to mitigate greenhouse gas emissions from pipeline pigging operations.

BACKGROUND

Pipelines are often used to carry petroleum fluids over long distances. Devices referred to as "pigs" or "scrapers" are used on a periodic basis to examine pipelines for corrosion and damage, and to clean the pipeline of accumulated deposits from the petroleum products. The pig typically resembles a piston with an outer diameter that closely matches the inner diameter of the pipeline. Pressurized fluids—including the petroleum products flowing through the pipeline—can be used to push the pig through the pipeline.

Often, the pigging process involves deploying a pig into the pipeline through a "pig launcher" that is connected as an adjacent component to the pipeline. The pig is retrieved from the pipeline at a receiving station, which is sometimes called a "pig receiver." In some applications, the launcher and receiver are configured to both launch and receive the pig.

It will be appreciated that the pig launcher and the pig receiver are isolated from the pressurized fluids in the pipeline during the process of loading the pig into the pig launcher and removing the pig from the pig receiver. Pressurized fluids are carried into the launcher through a "kicker" line that extends from the pipeline to the launching station. By opening and closing valves on the pipeline, kicker line and launching station, pressurized fluids can be diverted from the operational pipeline into the launching station to push the pig out of the launching station and through the pipeline. Similarly, the receiving station is connected to the pipeline through a series of valves that can be opened to temporarily divert the flow of fluids from the pipeline into the receiving station as the pig enters the receiving station. Once the pig has been captured within the receiving station, the valves can be manipulated to return flow to the pipeline.

When the pig arrives at the receiving station the pressurized petroleum fluids are captured within the receiving station. To allow the pig to be safely removed through a door in the receiving station, the pressurized fluids are typically vented to the atmosphere. Once the pressure inside the receiving station has been equalized with the atmosphere, the door in the receiving station can be opened to permit the removal of the pig.

Although generally effective, the practice of venting pressurized petroleum fluids into the atmosphere presents an environmental concern. Petroleum fluids may include aggressive greenhouse gases such as methane (natural gas) or selected hydrocarbon species that are regulated as volatile organic compounds. There is, therefore, a need for an improved system for controlling hydrocarbon emissions from pipeline pigging operations.

SUMMARY OF THE INVENTION

In some embodiments, the present disclosure is directed to an emissions control system for use in connection with a transfer station configured to retrieve a pipeline pig following a pipeline pigging operation. The emissions control system includes a transfer tank connected to the transfer station through a transfer line and a catalytic heater connected to the transfer tank through a catalytic feed line.

In other embodiments, the present disclosure is directed to a method for reducing hydrocarbon gas emissions resulting from a pigging operation carried out on a pipeline that transfers petroleum products under an operating pressure. The method begins with the steps of (1) placing a receiving station in fluid communication with the pipeline, (2) receiving a pig and an accompanying volume of pressurized hydrocarbon gases from the pipeline within the receiving station, and (3) isolating the receiving station from the operating pressure within the pipeline. The method continues with the steps of (4) transferring pressurized hydrocarbon gases within the receiving station to a transfer tank in an initial gas transfer operation with a first average flow rate, and (5) transferring the hydrocarbon gases from the transfer tank to a catalytic heater with a second average flow rate. The method also includes the steps of (6) converting the hydrocarbon gases to carbon dioxide in the catalytic heater, and (7) discharging the carbon dioxide from the catalytic heater.

In yet other embodiments, the present disclosure covers a method for reducing hydrocarbon gas emissions resulting from a pigging operation carried out on a pipeline that transfers petroleum products under an operating pressure. Here, the method includes the steps of (1) loading a pig into the launching station, (2) placing the launching station in fluid communication with the pipeline, (3) launching the pig into the pipeline, and (4) isolating the launching station from the operating pressure within the pipeline. The method continues with the steps of (5) transferring pressurized hydrocarbon gases within the launching station to a transfer tank in an initial gas transfer operation with a first average flow rate and (6) transferring the hydrocarbon gases from the transfer tank to a catalytic heater with a second average flow rate. The method continues with the steps of (7) converting the hydrocarbon gases to carbon dioxide in the catalytic heater, and (8) discharging the carbon dioxide from the catalytic heater.

Thus, systems and methods for reducing hydrocarbon gas emissions include the use of an emissions control system connected to a transfer station on a gas pipeline, where the emissions control system includes a transfer tank connected to the transfer station through a transfer line and a catalytic heater connected to the transfer tank through a catalytic feed line. The transfer station can be a pig launcher or a pig receiver. The methods call for transferring pressurized hydrocarbon gases from the transfer station to the transfer tank, which is sized to receive and hold a rapid transfer of a large volume of hydrocarbon gases from the transfer station. Once the gas transfer operation has taken place, the hydrocarbon gases can be more slowly processed through the catalytic heater from the transfer tank. The process can be repeated until a sufficient volume of hydrocarbon gases have been removed from the transfer station.

BRIEF DESCRIPTIONS OF THE DRAWINGS

These and other features, aspects, and advantages of the present disclosure will become better understood when the following detailed description is read with reference to the accompanying drawings in which like characters represent like parts throughout the drawings, wherein:

FIG. 1 presents an overview of a pig transfer station constructed in accordance with an embodiment of the present invention.

Figure 2:
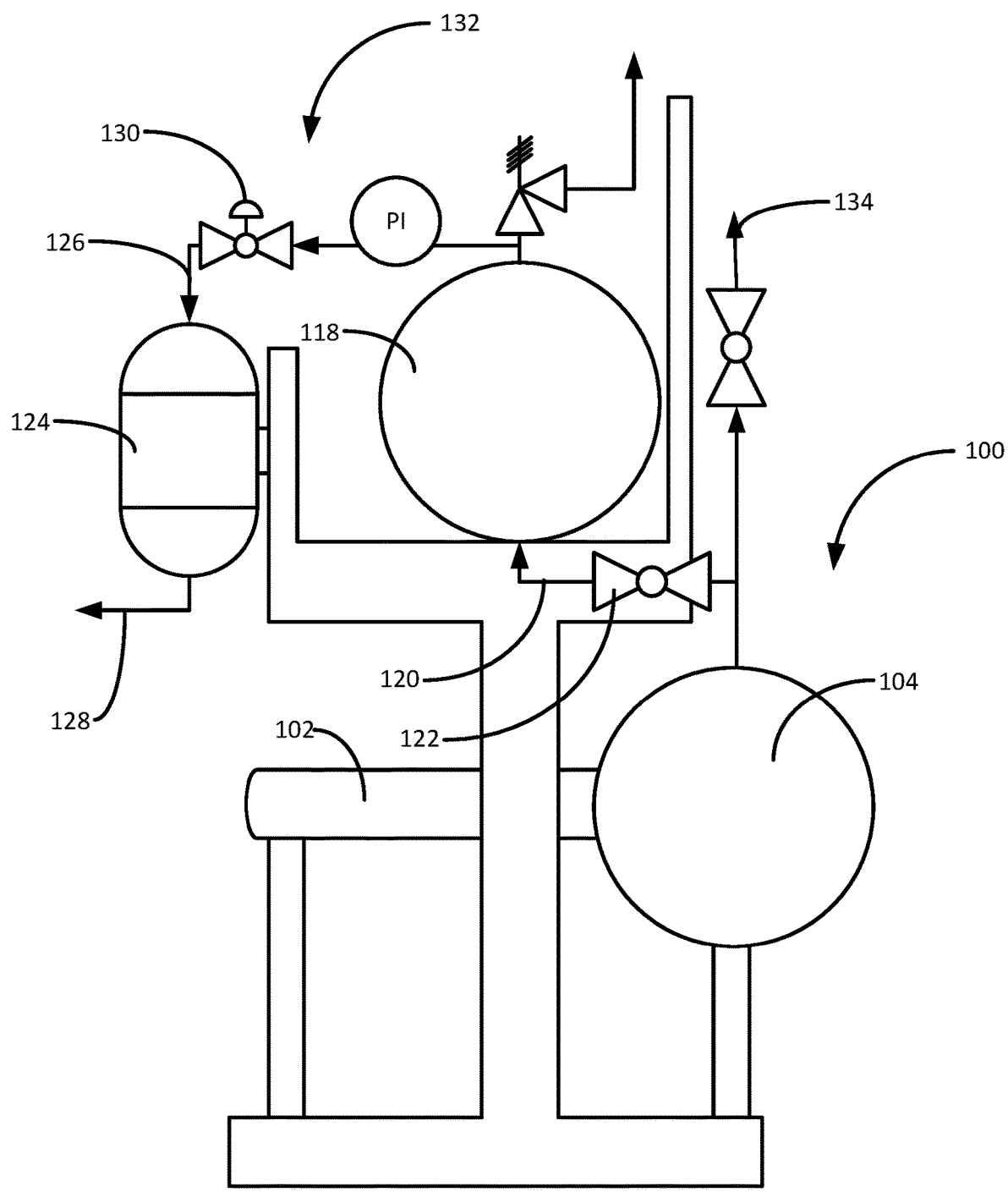

FIG. 2 presents an elevational view of the pig transfer station of FIG. 1.

Figure 3:
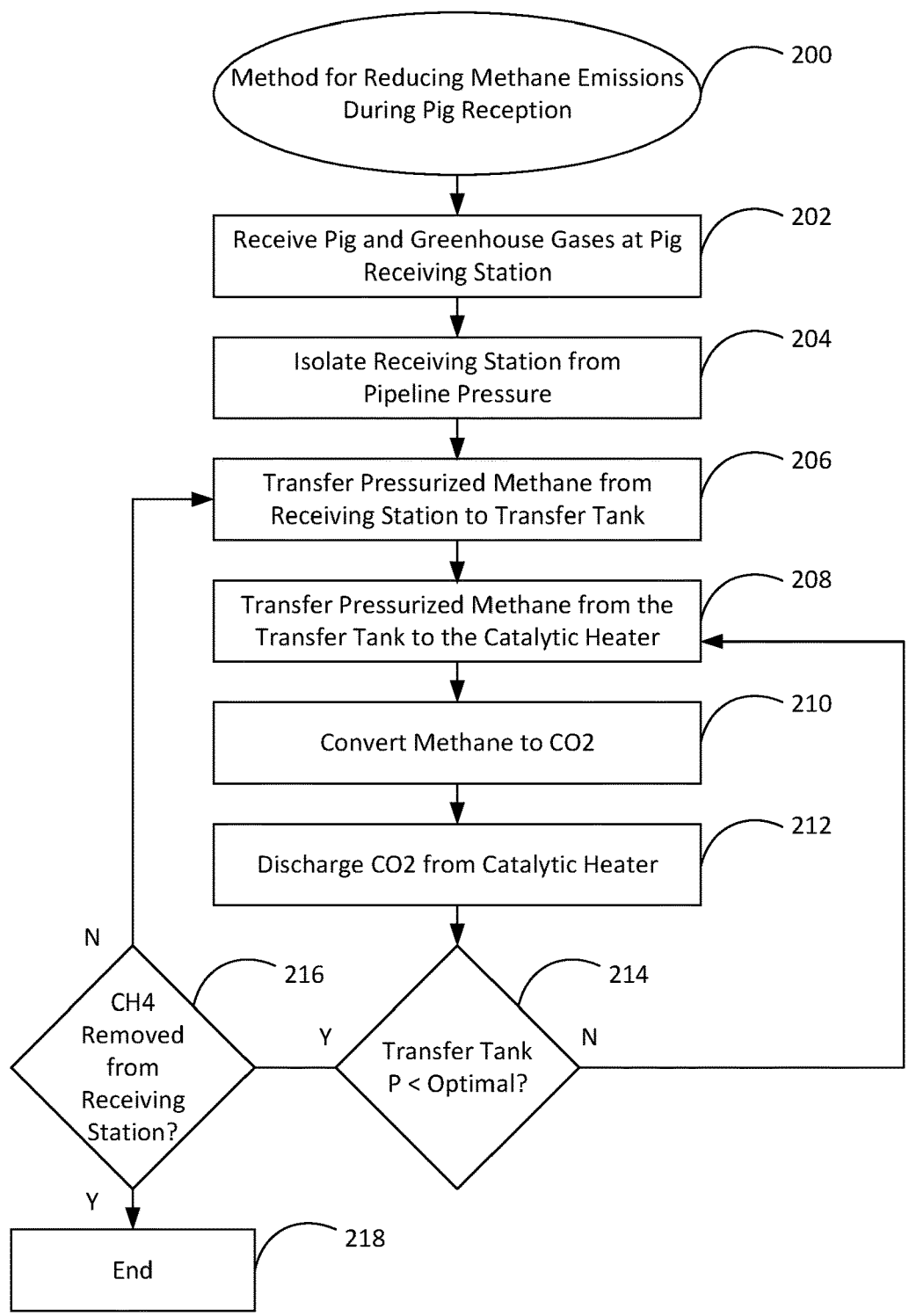

FIG. 3 presents a flowchart for a method for reducing methane emissions in which the transfer station is operated as a pig receiving station.

Figure 4:
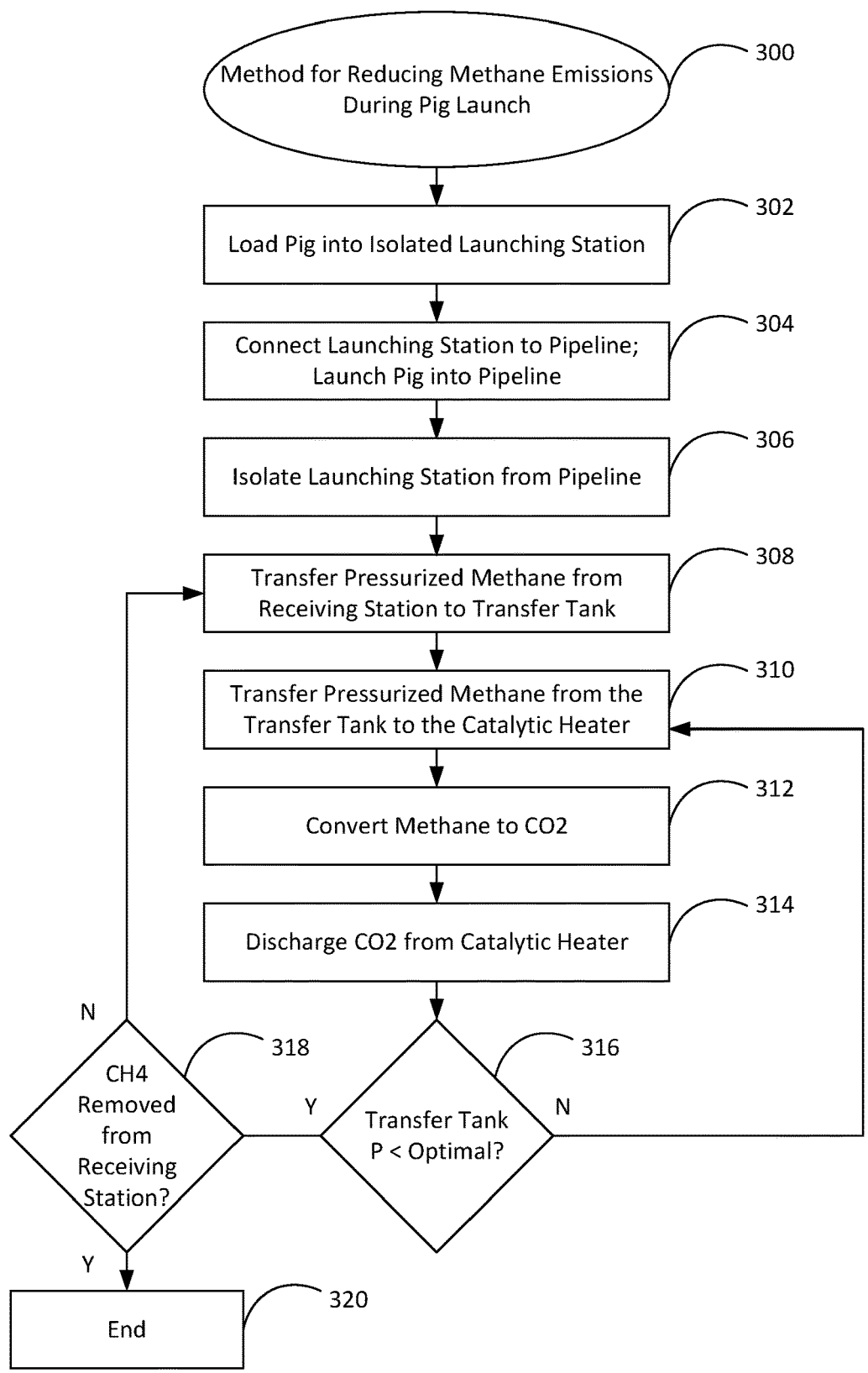

FIG. 4 presents a flowchart for a method for reducing methane emissions in which the transfer station is operated as a pig launching station.

DETAILED DESCRIPTION

In accordance with an embodiment of the present invention, FIG. 1 shows a pig transfer station 100 connected to a pipeline 102. As used herein, the term "pig transfer station 100" refers to both pig launching stations (pig launchers) and pig receiving stations (pig catchers). The transfer station 100 includes a barrel 104 that is configured to receive a pig 106. Unless otherwise specified, the term "pig" refers to any device that is moved through the pipeline 102 in the presence of pressurized fluids. The barrel 104 is connected to the pipeline 102 through a barrel valve 108. The transfer station 100 optionally includes a kicker line 110 that extends from the barrel 104 to the pipeline 102 through a kicker valve 112. The transfer station 100 includes a door 114 at the terminal end of the barrel 104 to permit the removal of the pig 106 from the barrel 104. A primary valve 116 on the pipeline 102 can be used to divert fluid into the transfer station 100 when the barrel valve 108 is opened.

It will be appreciated that the transfer station 100 depicted in FIG. 1 is merely exemplary. Additional components may be included within the pipeline 102 and transfer station 100. Additionally, in some applications, the transfer station 100 can be configured to serve as both a receiving station and a launching station to place the pig 106 into the pipeline 102 in both directions. As used herein, the term "fluid" refers to gases, liquids and multiphase mixtures of gases and liquids.

Unlike conventional transfer stations that include a vent that is configured to bleed pressurized fluids out of the barrel 104, exemplary embodiments of the transfer station 100 include a transfer tank 118 (not drawn to scale) that is connected to the barrel 104 of the transfer station 100 through a transfer line 120. Referring now also to FIG. 2, a transfer valve 122 on the transfer line 120 controls the flow of fluids from the barrel 104 into the transfer tank 118. It will be understood that fluids move from the barrel 104 to the transfer tank 118 under a pressure gradient between the transfer tank 118 and the barrel 104. The transfer tank 118 is suitably sized to sequester and isolate some of the petroleum fluids that are captured within the transfer station 100 from the barrel 104. The transfer valve 122 can be automatically or manually operated.

The transfer tank 118 is connected to a catalytic heater 124 through a feed line 126. The catalytic heater 124 converts methane (natural gas) and other volatile components into less environmentally harmful carbon dioxide, which is then released through a discharge mechanism 128, which can be configured to vent the processed gases to the atmosphere or direct the processed gases to downstream treatment or sequestration equipment. Suitable catalytic heaters are available from a variety of commercial sources that are designed specifically for use in oil and gas operations, or to heat gas meters and buildings. A control valve 130 on the feed line 126 is configured to automatically adjust the flow of gases from the transfer tank 118 to the catalytic heater 124. The flow rate to the catalytic heater 124 is adjusted to optimize the performance of the catalytic heater 124.

In an exemplary method of operation, the process begins when the pig 106 is captured within the transfer station 100. At this point, the kicker valve 112 and barrel valve 108 have been closed to prevent pipeline pressure from entering the transfer station 100. To reduce the pressure in the barrel 104, the transfer valve 122 is manually or automatically opened to vent pressure from the barrel 104 (or other portion of the transfer station 100) into the transfer tank 118. When the transfer tank 118 reaches the desired operating pressure, the transfer valve 122 can be closed by manual or automatic means. The control valve 130 opens to allow pressurized fluids to flow from the transfer tank 118 to the catalytic heater 124. The flow rate through the feed line 126 is adjusted to ensure optimal conversion of methane and other hydrocarbons to carbon dioxide within the catalytic heater 124. It is important to maintain the flow of gases from the transfer tank 118 to the catalytic heater 124 at a rate that does not exceed the maximum processing rate of the catalytic heater 124. The converted carbon dioxide is discharged from the catalytic heater 124 through the discharge mechanism 128.

Depending on the relative fluid volumes of the transfer station 100 and the transfer tank 118, and the conversion rate of the catalytic heater 124, it may be necessary to repeat the process of venting pressurized gases from the barrel 104 into the transfer tank 118. In exemplary embodiments, the transfer tank 118 is sized to accommodate one or more large, short-duration vent flows from the transfer station 100 into the transfer tank 118. The flow from the transfer tank 118 to the catalytic heater 124 can be slower to ensure good conversion of the natural gas to carbon dioxide. Because the pressurized gases in the barrel 104 can be rapidly evacuated into the transfer tank 114 before being more slowly metered to the catalytic heater 124, the transfer station 100 is not held in an offline state for an extended period by the slower dynamics of the catalytic process. In this way, the transfer tank 118 and catalytic heater 124 together form an emissions control system 132 that is capable of reducing the quantity of methane gas and other volatile hydrocarbon gases that would otherwise have been vented directly to the atmosphere when the pig 106 is captured within the transfer station 100.

Although the emissions control system 132 can be sized and configured to process all of the sequestered petroleum gases within the transfer station 100, it may nonetheless be desirable to include a conventional vent 134 to provide the optional bypass of the emissions control system 132 by releasing the petroleum fluids directly to the atmosphere.

Turning to FIG. 3, shown therein is an exemplary embodiment of a method 200 for reducing methane gas emissions following a pigging operation carried out on the pipeline 102 following the transfer of petroleum products. The method begins at step 202 by placing the pig receiving station 100 in fluid communication with the pipeline 102 to receive the pig 106 and a volume of greenhouse gases from the pipeline 102 through the coordinated manipulation of barrel valve 108, kicker valve 112 and primary valve 116. The method continues with at step 204 by isolating the receiving station 100 from the operating pressure within the pipeline 102. The barrel valve 108 and kicker valve 112 can be closed to isolate the receiving station 100 from the pipeline 102, while the primary valve 116 remains open to permit ongoing operation of the pipeline 102.

Next, at step 206, the method includes the step of transferring pressurized hydrocarbon gases within the receiving station 100 to the transfer tank 118 in an initial gas transfer operation with a first average flow rate. At step 208, the methane gas is transferred from the transfer tank 118 to the catalytic heater 124 with a second average flow rate. In most cases, the second average flow rate is less than the first average flow rate to promote full conversion of the methane to carbon dioxide at step 210. The carbon dioxide is discharged from the catalytic heater 124 to the atmosphere or downstream facilities at step 212.

As discussed above, the steps for removing the pressurized hydrocarbon gases in the receiving station 100 are repeated until a sufficient volume of hydrocarbon gases has been removed from the receiving station 100. At decision step 214, a determination is made whether the pressure of methane in the transfer tank 118 has fallen below a threshold pressure that supports the optimal conversion of methane to carbon dioxide in the catalytic heater 124. If the pressure in the transfer tank 118 is sufficient to support the efficient conversion of methane to carbon dioxide, the method 200 returns to step 208 as more methane is passed from the transfer tank 118 to the catalytic heater 124.

If the pressure in the transfer tank 118 has fallen below the threshold pressure, the method 200 moves to decision step 216. At decision step 216, a determination is made whether the pressure in the isolated receiving station 100 has been reduced below a threshold pressure, which represents the evacuation of a sufficient volume of methane gas from the receiving station 100. If the receiving station 100 still contains a volume of methane gas above the desired volume, the method 200 returns to step 206 and an additional volume of gas is evacuated from the receiving station 100 to the transfer tank 118 for further processing.

If the determination is made at step 216 that a sufficient quantity of methane has been removed from the receiving station 100, the method 200 ends at step 218 and the receiving station 100 can be accessed for to remove the pig 106 or brought back online with the pipeline 102. Residual gas in the receiving station 100 can be discharged through the conventional vent 134. The method 200 can be carried out on using manual, automated, or partially-automated control of the transfer valve 122 and control valve 130. In some embodiments, an external purging fluid such as nitrogen or another inert gas can be used to flush remaining petroleum gases out of the transfer station before the door 114 is opened to retrieve the pig 106.

Turning to FIG. 4, shown therein is a process flow diagram for a method 300 for reducing methane emissions during a pig launching operation. In the method 300 depicted in FIG. 4, the transfer station 100 is configured as a pig launching station and is used to reduce hydrocarbon gas emissions as the pig 106 is launched into the pipeline 102.

The method 300 begins at step 302 by loading the pig 106 into the launching station 100, which is not in fluid communication with the pipeline 102. When the door 114 has been closed, the launching station 100 is placed into fluid communication with the pipeline 102 and the pig 106 is launched into the pipeline 102. At step 306, the launching station 100 is isolated from the pipeline 102 through the coordinated manipulation of the barrel valve 108 and the kicker valve 112, thereby trapping pressurized methane inside the launching station 100.

Next, at step 308, the method 300 includes the step of transferring pressurized hydrocarbon gases within the launching station 100 to the transfer tank 118 in an initial gas transfer operation with a first average flow rate. At step 310, the methane gas is transferred from the transfer tank 118 to the catalytic heater 124 with a second average flow rate. In most cases, the second average flow rate is less than the first average flow rate to promote full conversion of the methane to carbon dioxide at step 312. The carbon dioxide is discharged from the catalytic heater 124 to the atmosphere or downstream facilities at step 314.

The steps for removing the pressurized hydrocarbon gases in the launching station 100 are repeated until a sufficient volume of hydrocarbon gases has been removed from the launching station 100. At decision step 316, a determination is made whether the pressure of methane in the transfer tank 118 has fallen below a threshold pressure that supports the optimal conversion of methane to carbon dioxide in the catalytic heater 124. If the pressure in the transfer tank 118 is sufficient to support the efficient conversion of methane to carbon dioxide, the method 300 returns to step 310 as more methane is passed from the transfer tank 118 to the catalytic heater 124.

If the pressure in the transfer tank 118 has fallen below the threshold pressure, the method 300 moves to decision step 318. At decision step 318, a determination is made whether the pressure in the isolated launching station 100 has been reduced below a threshold pressure, which represents the evacuation of a sufficient volume of methane gas from the launching station 100. If the launching station 100 still contains a volume of methane gas above the desired volume, the method 300 returns to step 308 and an additional volume of gas is evacuated from the launching station 100 to the transfer tank 118 for further processing.

If the determination is made at step 318 that a sufficient quantity of methane has been removed from the launching station 100, the method 300 ends at step 320 and the launching station 100 can be accessed for cleaning, to load another pig 106, or to be reconfigured as a receiving station. The method 300 can be carried out on using manual, automated, or partially-automated control of the transfer valve 122 and control valve 130. In some embodiments, an external purging fluid such as nitrogen or another inert gas can be used to flush remaining petroleum gases out of the transfer station before the door 114 is opened to retrieve the pig 106.

This written description uses examples to disclose the claimed subject matter, including the best mode, and also to enable any person skilled in the art to practice the subject matter, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reducing hydrocarbon gas emissions resulting from a pigging operation carried out on a pipeline that transfers petroleum products under an operating pressure, the method comprising the steps of:
  (1) placing a receiving station in fluid communication with the pipeline;
  (2) receiving a pig and an accompanying volume of pressurized hydrocarbon gases from the pipeline within the receiving station;
  (3) isolating the receiving station from the operating pressure within the pipeline;
  (4) transferring the pressurized hydrocarbon gases within the receiving station to a transfer tank in an initial gas transfer operation with a first flow rate;
  (5) transferring the pressurized hydrocarbon gases from the transfer tank to a catalytic heater with a second flow rate;
  (6) reducing hydrocarbon emissions from the pipeline by converting the pressurized hydrocarbon gases to carbon dioxide in the catalytic heater; and
  (7) discharging the carbon dioxide from the catalytic heater.

2. The method of claim 1, wherein the first flow rate is larger than the second average flow rate.

3. The method of claim 1, wherein the step (7) of discharging the carbon dioxide comprises discharging the carbon dioxide from the catalytic heater into the atmosphere.

4. The method of claim 1, wherein after the step (4) of transferring the pressurized hydrocarbon gases to the transfer tank, the method comprises a step (4.5) of closing a transfer valve between the receiving station and the transfer tank to isolate the receiving station from the transfer tank.

5. The method of claim 4, wherein after the step (7) of discharging the carbon dioxide from the catalytic heater, the method comprises a step (8) of opening the transfer valve to permit flow of additional gases from the receiving station into the transfer tank.

6. The method of claim 5, wherein steps (4-8) are repeated until a first volume of hydrocarbon gases has been removed from the receiving station.

7. The method of claim 5, wherein the step (8) of opening the transfer valve to permit the flow of additional gases from the receiving station into the transfer tank takes place before all of the pressurized hydrocarbon gases from the initial gas transfer operation have been processed by the catalytic heater.

8. The method of claim 6, wherein steps (5-7) continue to take place after the first volume of hydrocarbon gases has been removed from the receiving station.

9. A method for reducing hydrocarbon gas emissions resulting from a pigging operation carried out on a pipeline that transfers petroleum products under an operating pressure, the method comprising the steps of:
  (1) loading a pig into the launching station;
  (2) placing the launching station in fluid communication with the pipeline;
  (3) launching the pig into the pipeline;
  (4) isolating the launching station from the operating pressure within the pipeline;
  (5) transferring pressurized hydrocarbon gases within the launching station to a transfer tank in an initial gas transfer operation with a first flow rate;
  (6) transferring the pressurized hydrocarbon gases from the transfer tank to a catalytic heater with a second flow rate;
  (7) reducing hydrocarbon emissions from the pipeline by converting the pressurized hydrocarbon gases to carbon dioxide in the catalytic heater; and
  (8) discharging the carbon dioxide from the catalytic heater.

10. The method of claim 9, wherein the first flow rate is larger than the second flow rate.

11. The method of claim 9, wherein the step (8) of discharging the carbon dioxide comprises discharging the carbon dioxide from the catalytic heater into the atmosphere.

12. The method of claim 9, wherein after the step (5) of transferring the pressurized hydrocarbon gases to the transfer tank, the method comprises a step (5.5) of closing a transfer valve between the launching station and the transfer tank to isolate the launching station from the transfer tank.

13. The method of claim 12, wherein after the step (8) of discharging the carbon dioxide from the catalytic heater, the method comprises a step (9) of opening the transfer valve to permit the flow of additional gases from the launching station into the transfer tank.

14. The method of claim 13, wherein steps (5-9) are repeated until a first volume of hydrocarbon gases has been removed from the launching station.

15. The method of claim 13, wherein the step (9) of opening the transfer valve to permit the flow of additional gases from the launching station into the transfer tank takes place before all of the pressurized hydrocarbon gases from the initial gas transfer operation have been processed by the catalytic heater.

16. The method of claim 14, wherein steps (6-8) continue to take place after the first volume of hydrocarbon gases has been removed from the launching station.

* * * * *